United States Patent [19]
Gladieux et al.

[11] 4,216,005
[45] Aug. 5, 1980

[54] GLASS CONVEYING ROLL AND A METHOD OF FORMING IT

[75] Inventors: Norman K. Gladieux, Oregon; Carey M. Allen; Thomas J. Koralewski, both of Toledo, all of Ohio

[73] Assignee: Libbey-Owens-Ford Company, Toledo, Ohio

[21] Appl. No.: 1,023

[22] Filed: Jan. 4, 1979

[51] Int. Cl.² .................................................. C03B 13/16
[52] U.S. Cl. ........................................ 65/374 R; 65/245; 65/253; 29/132; 427/443.2
[58] Field of Search .............. 65/374 R, 181, 253, 65/245; 29/132; 427/430 R, 430 B

[56] References Cited
U.S. PATENT DOCUMENTS

| | | | |
|---|---|---|---|
| 1,825,509 | 9/1931 | Collins | 427/430 R |
| 2,232,765 | 2/1941 | Bliven | 193/37 |
| 2,385,653 | 9/1945 | Rockola | 427/430 R X |
| 3,736,179 | 5/1973 | Gier et al. | 427/430 B X |
| 3,853,525 | 12/1974 | Gorman | 65/374 R X |
| 3,877,919 | 4/1975 | Shorr | 29/132 X |
| 4,057,410 | 11/1977 | Daman et al. | 65/99 A |

Primary Examiner—Arthur D. Kellogg
Attorney, Agent, or Firm—Collins, Oberlin & Darr

[57] ABSTRACT

A roll for conveying flat glass at elevated temperatures over extended periods of time without material damage to the supported surface of the glass, and a procedure for preparing such rolls. The roll is built up of thin asbestos discs compressed endwise upon a mandrel. The asbestos is impregnated with a solution of potassium sulfate and then thoroughly dried before the roll is put into use. The potassium sulfate crystals provide lubricity to the roll surface and bind the asbestos fibers together so as to improve the durability of the roll while minimizing damage to the heated glass.

12 Claims, 5 Drawing Figures

GLASS CONVEYING ROLL AND A METHOD OF FORMING IT

BACKGROUND OF THE INVENTION

1. Field of the Invention

The present invention relates broadly to the conveying of sheets or a ribbon of flat glass at elevated temperatures, and more particularly to an improved roll of a fibrous heat resistant material for use in the conveying of such glass, and a method of preparing such a roll. The roll is treated with a solution of potassium sulfate which greatly enhances the lubricity of its surface and binds the fibers together so as to extend its service life and permit its use under temperature conditions not heretofore possible.

2. Description of the Prior Art

In the manufacture of flat glass, a continuous ribbon or sheet of glass is conventionally received from any of the well known plate, sheet or float glass forming devices upon a series of aligned rolls for conveying into and through an adjoining annealing lehr. As received from the forming area, the ribbon or sheet is in a highly heated condition so that its ultimate optical quality can be adversely affected by contact with the conveyor rolls. This is particularly true of glass made by the float process, with which the present invention has particular utility. As shown by U.S. Pat. No. 3,083,551 to Pilkington, glass made by that process leaves the bath chamber in its final useable form with highly polished surfaces. The ribbon is at a relatively high temperature, on the order of 900° to 1400° F. (480° to 760° C.), and thus in a softened condition as it is removed from the bath chamber, and is gradually cooled according to a predetermined pattern as it travels through the annealing lehr. In order to withstand the temperatures to which they are subjected while maintaining a suitable supporting surface, the rolls are generally constructed of an appropriate heat resistant material such as stainless steel or asbestos.

Because of its elevated temperature and the nature of the process, the ribbon is highly susceptible to factors detracting from its ultimate optical quality at this time, particularly during the early stages of the annealing process. Thus, any irregularity or imperfection in the surface of the roll will imprint a corresponding defect in the lower surface of the ribbon while it is in a softened condition. Such irregularities may be caused by scratching of the roll surface, or by the accumulation of deposits thereon, particularly in the initial stages of the annealing process. Thus, in producing float glass tin compounds, generally tin oxides, may be carried from the molten metal bath by the glass ribbon and deposited upon the supporting rolls. These deposits accumulate and eventually cause roll imprinting upon the bottom surface of the ribbon. In an effort to minimize the effects of such deposits and extend the service life of the rolls as well as for other reasons, it has been proposed in U.S. Pat. No. 3,199,966 to Snow et al to treat the glass ribbon with $SO_2$ gas for providing a lubricating or parting effect between the roll surface and ribbon. However, this treatment can itself result in the formation of sodium sulfate deposits on the rolls which will also eventually mark the bottom surface of the glass. Due to the severe temperature conditions to which they are subjected, the rolls may also tend to develop slight eccentricities, or become out of round, resulting in formation of abrasion or scuff marks on the ribbon of glass as they rotate. Continuous exposure to these operating conditions causes the rolls, particularly asbestos rolls at the hot or furnace end of the annealing lehr, to deteriorate rather rapidly so that they may have a serviceable life of only a few days in some locations, while their use may be entirely ruled out in areas experiencing the most severe operating conditions.

It has been suggested in U.S. Pat. No. 3,853,525 to Gorman that the material-supporting surface of rolls adapted for supporting and conveying glass at elevated temperatures be provided with a coating of boron nitride whose self-lubricating properties will minimize friction between the roll and the glass. U.S. Pat. No. 4,057,410 to Daman et al discloses use of a heat shield of mill board or hot board treated with potassium sulphate for insulating purposes in a float glass producing facility. The thus treated material is said to not mark the glass ribbon should it come in contact therewith.

SUMMARY OF THE INVENTION

In accordance with the present invention, asbestos rolls for use in the conveying of heated glass are chemically treated so as to improve the self-lubrication or lubricity of their surface which comes into contact with the glass. The tendency for deposits to accumulate on the surface of the roll is thereby reduced, and any defects which do appear upon the roll surface are less likely to damage the surface of the glass because of the self lubricating effect. Furthermore, the material with which the roll is treated permeates the asbestos and crystallizes upon drying, and the crystals serve to bind the asbestos particles together so that the entire body becomes a cohesive mass from which individual asbestos fibers are less likely to be torn loose than from similar untreated rolls or rolls merely coated with a non-crystalline lubricating material.

It is, therefore, a primary object of the invention to provide a roll for conveying glass at elevated temperatures in which roll imprinting upon the supported surface of the glass is minimized.

Another object of the invention is to provide such a roll having a reduced tendency to develop surface irregularities.

Another object of the invention is to extend the service life of asbestos glass conveying rolls.

Still another object is to provide a procedure for treating such rolls which improves both lubricity of the roll surface and bonding of the asbestos material.

Other objects and advantages will become more apparent when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENT

Figure 1:
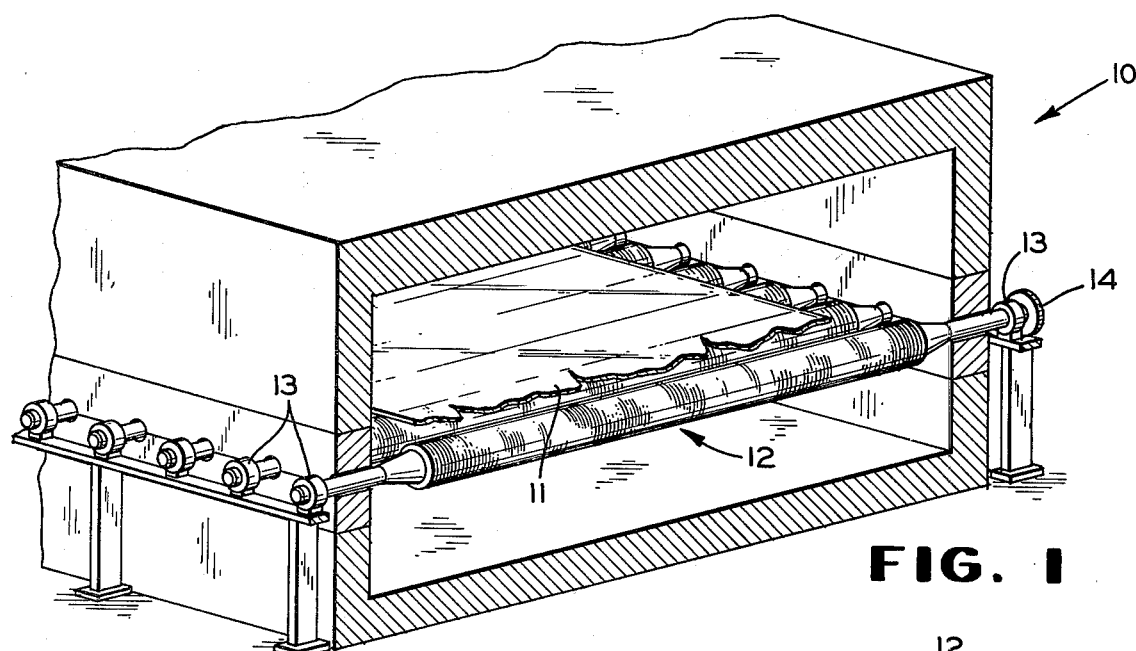
FIG. 1 is a perspective view, partially in section, of a portion of a typical annealing lehr in which rolls fabricated in accordance with the invention are employed.

Referring to the drawings, there is illustrated in FIG. 1 a section of a typical annealing lehr 10 through which a glass ribbon 11 is carried upon a series of horizontally aligned driven rolls 12 in the well known manner. In such a lehr, heaters (not shown) are provided for regulating the interior temperature of the lehr to gradually allow the temperature of the ribbon to be lowered according to a predetermined pattern and thereby properly anneal the glass passing therethrough. The rolls are conventionally carried in journals 13 at their ends and driven by a gear 14 engaging a worm on a line shaft (not shown).

Figure 2:
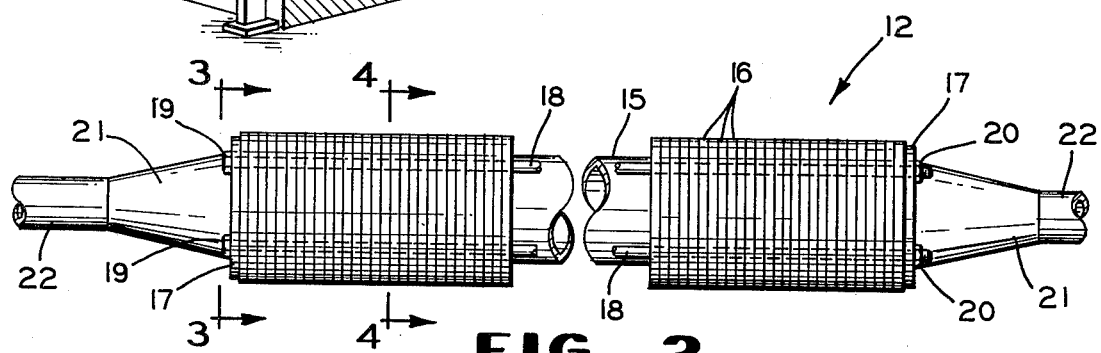
FIG. 2 is an elevational view, with parts broken away, of a typical roll constructed in accordance with the invention.
Figure 3:
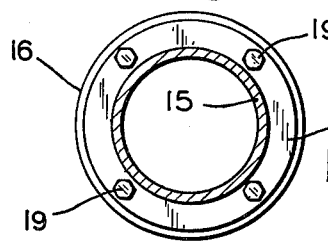
FIG. 3 is a transverse section through the roll, taken substantially along line 3—3 of FIG. 2.
Figure 4:
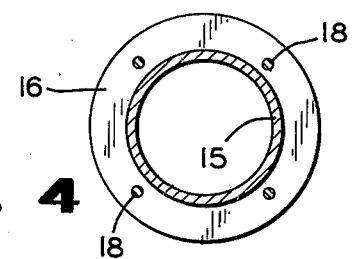
FIG. 4 is a transverse section through the roll, taken substantially along line 4—4 of FIG. 2.

As best shown in FIG. 2, the rolls 12 of the invention comprise a hollow tubular mandrel 15 upon which a plurality of asbestos discs 16 are mounted in face-to-face abutting relation. The discs are axially compressed upon the mandrel between end plates 17 by means of bolts 18. The bolts extend through the plates and discs and have heads 19 and threaded nuts 20 bearing against the outer faces of the end plates which are conventionally manipulated to compress the discs. Tapered end sections 21 are affixed to the ends of the mandrel 15, and tubular bearing extensions 22 are provided thereon for rotatably mounting the rolls in the journals 13. The gear 14 is affixed to one of these tubular extensions.

When the discs have been placed under suitable axial compression, they provide a rigid dense outer surface for supporting the glass sheet or ribbon. The roll is normally turned in a lathe and lapped or otherwise finished prior to use in order to provide a smooth, cylindrical working surface for contacting the glass. In accordance with one embodiment of the present invention, after the roll is thus readied for use, the central sheet supporting portion is immersed in an aqueous solution of potassium sulphate and the solution is allowed to permeate the asbestos material. The roll is removed from the solution and allowed to air dry for an initial period, and then placed in a kiln where its temperature is gradually raised over a period of time until the asbestos is thoroughly dried and the roll has reached an equilibrium temperature approximating that at which it will operate within the annealing lehr 10. Since lehr rolls must normally be gradually heated to anticipated operating temperature prior to installation in an operating annealing lehr to prevent thermal shock damage to the roll and glass ribbon, it may then advantageously be installed directly in the lehr. Of course, the roll may be allowed to cool and then reheated in the normal manner at any time for installation. Smoothing of the roll surface may be desirable to eliminate any roughening caused by the treatment with the potassium sulphate solution. This may be accomplished by finishing with a fine abrasive belt. If the roll is to be inserted directly from the drying kiln into the lehr, the refinishing should be completed following the air drying and prior to drying in the kiln. Of course, the individual discs 16 may also be immersed in the solution and dried prior to their assembly upon the mandrel 15.

Figure 5:
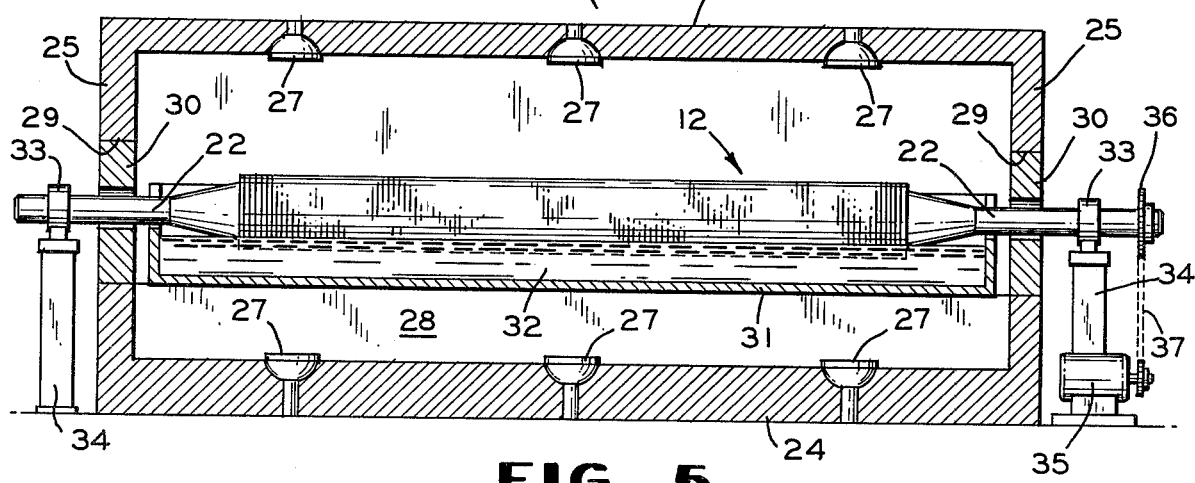
FIG. 5 is a vertical section of one form of apparatus for preparing a roll in accordance with the invention.

There is illustrated in FIG. 5 one form of apparatus for preparing a roll in accordance with the invention. Thus, there is provided an enclosed kiln indicated generally at 23, defined by a floor 24, side walls 25, a roof 26 and end walls (not shown). Heaters 27 such as conventional gas burners are provided in the roof and in a recess 28 in the floor, and openings 29 are provided in the side walls for inserting and removing a roll 12. The openings may be at least partially closed around the bearing extensions 22 of the roll by refractory blocks 30. A removable trough 31 resting upon the floor 24 over the recess 28 contains the aqueous solution 32 of potassium sulphate within which the lower portions of the asbestos discs 16 of the roll are immersed. The roll is rotated while thus partially immersed in order to permit the solution to permeate the entire asbestos section. The roll must also be continuously rotated while being heated so as to avoid warping. To this end, the bearing extensions 22 of the roll are carried in bearings 33 supported upon pedestals 34 at either side of the kiln, and a motor driven gear reduction unit 35 is connected to the roll as by a sprocket 36 and chain 37.

It has been found that if the rolls are not properly dried prior to installation in the lehr, or if they are heated too rapidly in the drying kiln, moisture entrapped in the interior of the asbestos is converted to steam and, as it expands and excapes, it causes decrepitation of the surface of the roll. To avoid this, after initial air drying has removed the external moisture from the treated roll, it is placed in the kiln, from which the trough 31 has been removed, and the heaters are activated to begin heating of the roll according to a predetermined schedule. More particularly, the temperature of the kiln is slowly raised in increments of about 100° F. (37.8° C.) with the temperature remaining at each level for approximately one hour, until it reaches 600° F. (315.6° C.). Thereafter, the temperature may be raised steadily until it reaches about 1000° F. (537.8° C.) and then, as the case may be, lowered to room temperature, or to anticipated lehr operating temperature where the roll is to be installed directly in the lehr.

By way of example, an asbestos roll constructed in accordance with the invention was prepared for use in apparatus generally as illustrated in FIG. 5. The trough contained a saturated solution of potassium sulphate in warm water at a temperature of about 160° F. (71.1° C.). The asbestos discs 16 had an outside diameter of 12 inches (30.48 cm) and an inside diameter of 9 inches (22.86 cm) with the roll being immersed to a depth of 2 inches (5.08 cm) in the solution. The rolls were rotated at a rate of about 22 RPM for approximately one-half hour while thus partially immersed, during which time the liquid was constantly agitated to insure uniformity of the solution. At the end of this time the roll was removed from the trough and allowed to air dry overnight, after which its surface was refinished with a fine abrasive belt. The roll was then heated in the kiln while being constantly rotated. To accomplish this the heaters 27, in this case Selas gas burners, were turned on and the kiln temperature was slowly raised in 100° F. (37.8° C.) increments, with the temperature being allowed to remain at each increment point from 100° F. (37.8° C.) through 600° F. (315.6° C.) for approximately one hour. Thereafter the burners were turned on full until a temperature of 1000° F. (537.8° C.) was attained. After approximately one-half hour at this temperature, the burners were turned off and the kiln was allowed to cool down.

The roll was examined after cooling and appeared to be satisfactory. It was then, after preheating, installed at the No. 6 position, that is, the sixth roll from the entrance end, of a continuously operating float glass lehr. Examination of the roll after five days of glass production indicated there was no deterioration of, or damage to, the roll surface. Examination of the glass at this time indicated no flaws which could be attributed to the asbestos roll.

Operation of a conventional untreated asbestos roll at the No. 6 position of a continuous lehr, as described in the above example, would be practically impossible, and such a roll would certainly have a very short service life of a few hours. A roll treated in accordance with the invention, on the other hand, has been found to have an extended service life under the same operating conditions. In the early stages of a lehr it has heretofore been necessary to use stainless steel rolls, which require frequent cleaning or refinishing. Chrome plating of the rolls reduces the frequency of cleaning but is relatively expensive. The rolls of the present invention, on the other hand, have proven highly satisfactory at a cost approximating one third that of chrome plated stainless steel rolls.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. In a method of treating a roll including an outer asbestos material-supporting portion for conveying glass at elevated temperatures, the steps of preparing an aqueous solution of potassium sulfate, immersing said outer asbestos portion in said solution for a period of time sufficient to allow said solution to penetrate said asbestos, removing said outer asbestos portion from said solution, and drying said outer asbestos portion whereby potassium sulfate crystallizes within the asbestos.

2. A method of treating a roll for conveying glass as claimed in claim 1, wherein said drying is accomplished by first allowing said outer asbestos portion to air dry in the ambient atmosphere to evaporate the surface moisture, and thereafter subjecting it to heat to gradually increase its temperature until substantially all of the moisture is removed.

3. A method of treating a roll for conveying glass as claimed in claim 1 or claim 2, wherein said aqueous solution is a saturated solution of potassium sulfate agitated to maintain the uniformity of the solution.

4. A method of treating a roll for conveying glass as claimed in claim 1 or claim 2, wherein said solution is maintained at a temperature of about 160° F. while said asbestos is immersed therein.

5. A method of treating a roll for conveying glass as claimed in claim 1, including the steps of positioning said roll over said solution with its longitudinal axis parallel to the surface of, and its lower portion immersed in, said solution, and rotating said roll about its longitudinal axis to progressively immerse the periphery of said outer asbestos portion.

6. A method of treating a roll for conveying glass as claimed in claim 2, wherein the temperature to which said outer asbestos portion is exposed in applying said heat is at least partially increased in increments, with the temperature remaining at each increment point for a time sufficient to permit gradual escape of entrapped moisture.

7. A method of treating a roll for conveying glass as claimed in claim 6, wherein the temperature is increased in 100° F. increments from 100° F. through 600° F., and thereafter is increased to about 1000° F.

8. A method of treating a roll for conveying glass as claimed in claim 7, including the step of directly inserting the prepared roll in an operating glass producing facility while said outer asbestos material-supporting portion remains in the heated state.

9. A method of treating a roll for conveying glass as claimed in claim 2, wherein said aqueous solution is a saturated solution of potassium sulfate maintained at a temperature of about 160° F. and agitated to maintain the uniformity of the solution while said asbestos is immersed therein, including the steps of positioning said roll over said solution with its longitudinal axis parallel to the surface of, and its lower portion immersed in, said solution, rotating the roll about its longitudinal axis to progressively immerse the periphery of said outer asbestos portion, and wherein the temperature to which said outer asbestos portion is exposed in applying said heat is increased in 100° F. increments from 100° F. through 600° F., with the temperature remaining at each increment point for a time sufficient to permit gradual escape of entrapped moisture, and thereafter increased to about 1000° F.

10. In a roll for conveying glass at elevated temperatures including an asbestos portion upon which the glass is carried, the improvement wherein said asbestos is impregnated with crystallized potassium sulfate.

11. A roll for conveying glass at elevated temperatures as claimed in claim 10, wherein said asbestos portion comprises a plurality of asbestos discs axially compressed upon a central mandrel.

12. A roll for conveying glass at elevated temperatures as claimed in claim 11, wherein said potassium sulfate substantially permeates said discs from their exterior surface to said mandrel, the potassium sulfate crystals providing lubricity to the glass conveying surface and binding the asbestos fibers together.

* * * * *